US009301165B2

(12) United States Patent
Yang et al.

(10) Patent No.: US 9,301,165 B2
(45) Date of Patent: Mar. 29, 2016

(54) DYNAMIC CONTROL FOR MULTI-LAYER SELF OPTIMIZATION

(71) Applicants: Verizon Patent and Licensing Inc., Arlington, VA (US); Cellco Partnership, Arlington, VA (US)

(72) Inventors: Jin Yang, Orinda, CA (US); Matthew W. Nelson, Pleasanton, CA (US); Michael A. Lombardo, Bethlehem, PA (US); Xin He, Basking Ridge, NJ (US); Dragan Cuberovic, Flower Mound, TX (US); Maria G. Lam, Oakland, CA (US); Ranjeev Mahtani, Oakland, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 18 days.

(21) Appl. No.: 14/329,471

(22) Filed: Jul. 11, 2014

(65) Prior Publication Data

US 2016/0014618 A1 Jan. 14, 2016

(51) Int. Cl.
*H04W 24/02* (2009.01)
*H04L 29/08* (2006.01)
*H04W 64/00* (2009.01)
*H04W 84/18* (2009.01)

(52) U.S. Cl.
CPC ............. *H04W 24/02* (2013.01); *H04L 67/12* (2013.01); *H04W 64/003* (2013.01); *H04W 84/18* (2013.01)

(58) Field of Classification Search
CPC ..... H04W 24/00; H04W 24/02; H04W 24/04; H04W 64/003; H04L 67/12
See application file for complete search history.

(56) References Cited

U.S. PATENT DOCUMENTS

| 2012/0094653 A1* | 4/2012 | Okuda | H04W 24/02 455/422.1 |
| 2013/0170362 A1* | 7/2013 | Futaki | H04W 24/02 370/241.1 |
| 2014/0140278 A1* | 5/2014 | Chou | H04W 52/0235 370/328 |

* cited by examiner

*Primary Examiner* — Anh Ngoc Nguyen

(57) ABSTRACT

A device may determine that a parameter of a base station, included in a network, is to be adjusted. The device may determine a first proposed adjustment based on a first SON algorithm associated with adjusting the parameter based on performance information of multiple base stations included in the network. The device may determine a second proposed adjustment based on a second SON algorithm associated with adjusting the parameter based on performance information of the base station. The device may determine a weight factor, associated with the base station, based on a relationship between the base station and one or more neighbor base stations included in the network. The device may determine a final adjustment based on the first proposed adjustment, the second proposed adjustment, and the weight factor. The device may cause the parameter of the base station to be adjusted based on the final adjustment.

20 Claims, 12 Drawing Sheets

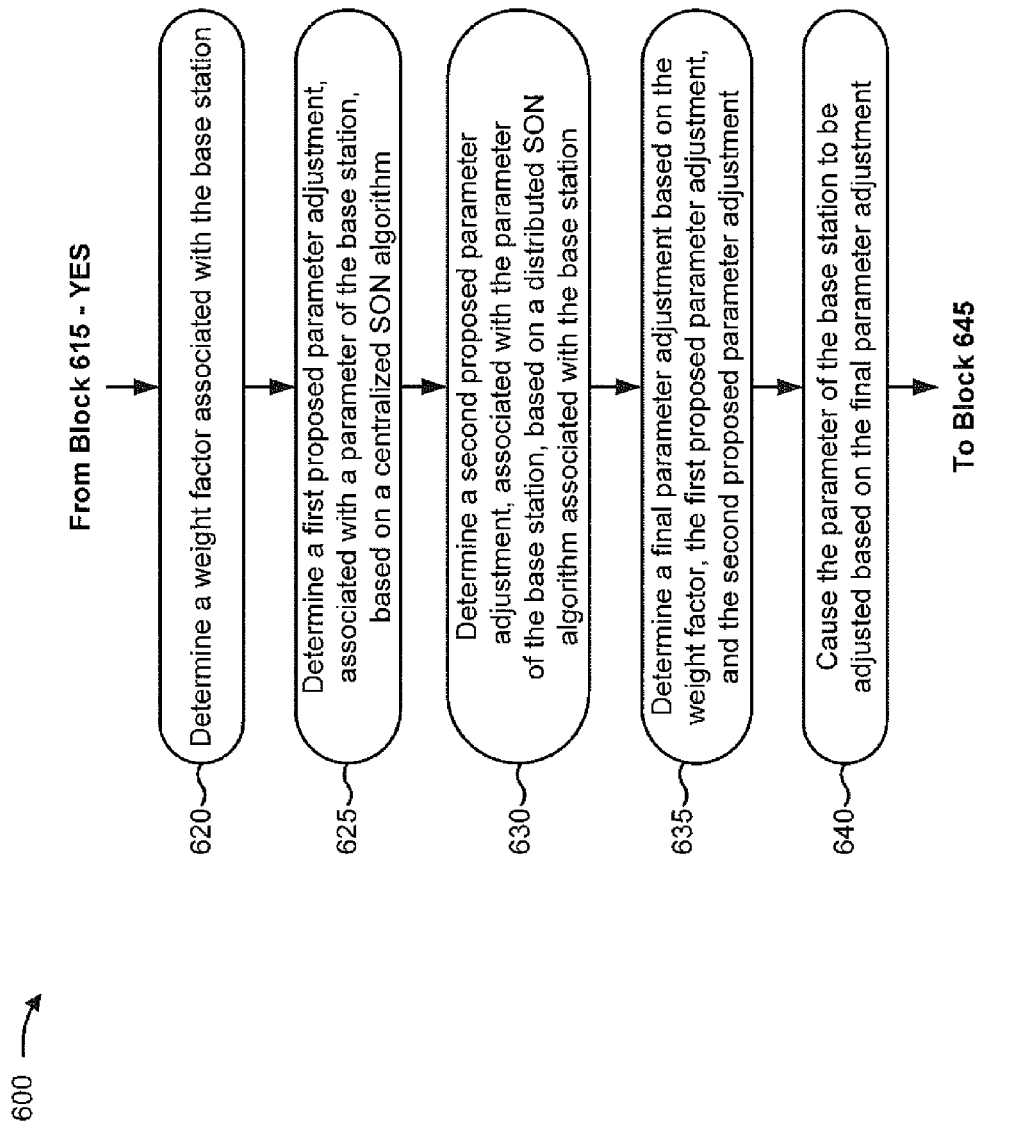

DYNAMIC CONTROL FOR MULTI-LAYER SELF OPTIMIZATION

BACKGROUND

A self-organizing network (SON) attempts to make planning, configuration, management, optimization, healing etc. of a communication network simpler and faster. A SON may be implemented in different architectures, such as a distributed architecture, a centralized architecture, and/or a hybrid architecture, and may be sub-divided into functional categories, such as self-configuration, self-optimization, and self-healing.

BRIEF DESCRIPTION OF THE DRAWINGS

FIGS. 6A and 6B are flow charts of an example process for determining a final parameter adjustment, associated with a parameter of a base station, based on a first proposed parameter adjustment, associated with a centralized SON algorithm, and a second proposed parameter adjustment associated with a distributed SON algorithm.

DETAILED DESCRIPTION OF PREFERRED EMBODIMENTS

The following detailed description of example implementations refers to the accompanying drawings. The same reference numbers in different drawings may identify the same or similar elements.

SONs have gained increased attention due to exponentially increasing traffic growth and network densification. In some cases, a centralized network management device (e.g., associated with a network management system), included in a network, may be configured to adjust parameters of base stations, included in the network, based on implementing a centralized SON algorithm (e.g., an optimization algorithm associated multiple base stations include in the network). Similarly, a base station, included in the network, may be configured to adjust parameters of the base station based on implementing a distributed SON algorithm (e.g., an optimization algorithm associated with the base station). In some cases, either the network management device or the base station may be disabled from updating a parameter of the base station in order to avoid conflicting parameter adjustments as a result of the conflicting SON algorithms. Implementations described herein may provide a dynamic control mechanism that integrates parameter adjustments, provided by a network management device (e.g., a centralized SON algorithm) and a base station (e.g., a distributed SON algorithm), such that the parameter adjusts do not conflict, require one SON algorithm to override another SON algorithm, or require either SON algorithm to be disabled.

Figure 1A:
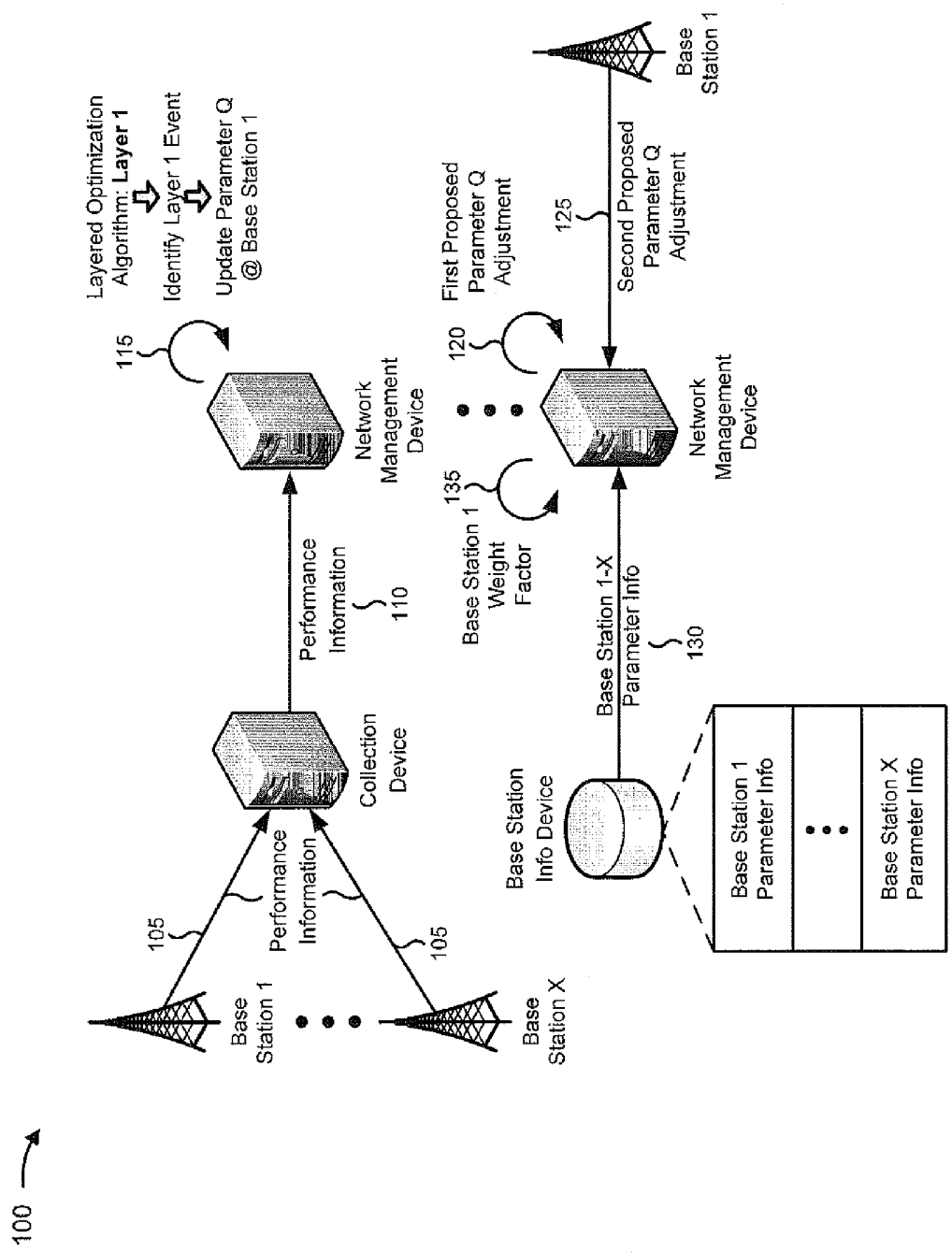
FIGS. 1A and 1B are diagrams of an overview of an example implementation described herein.
Figure 1B:
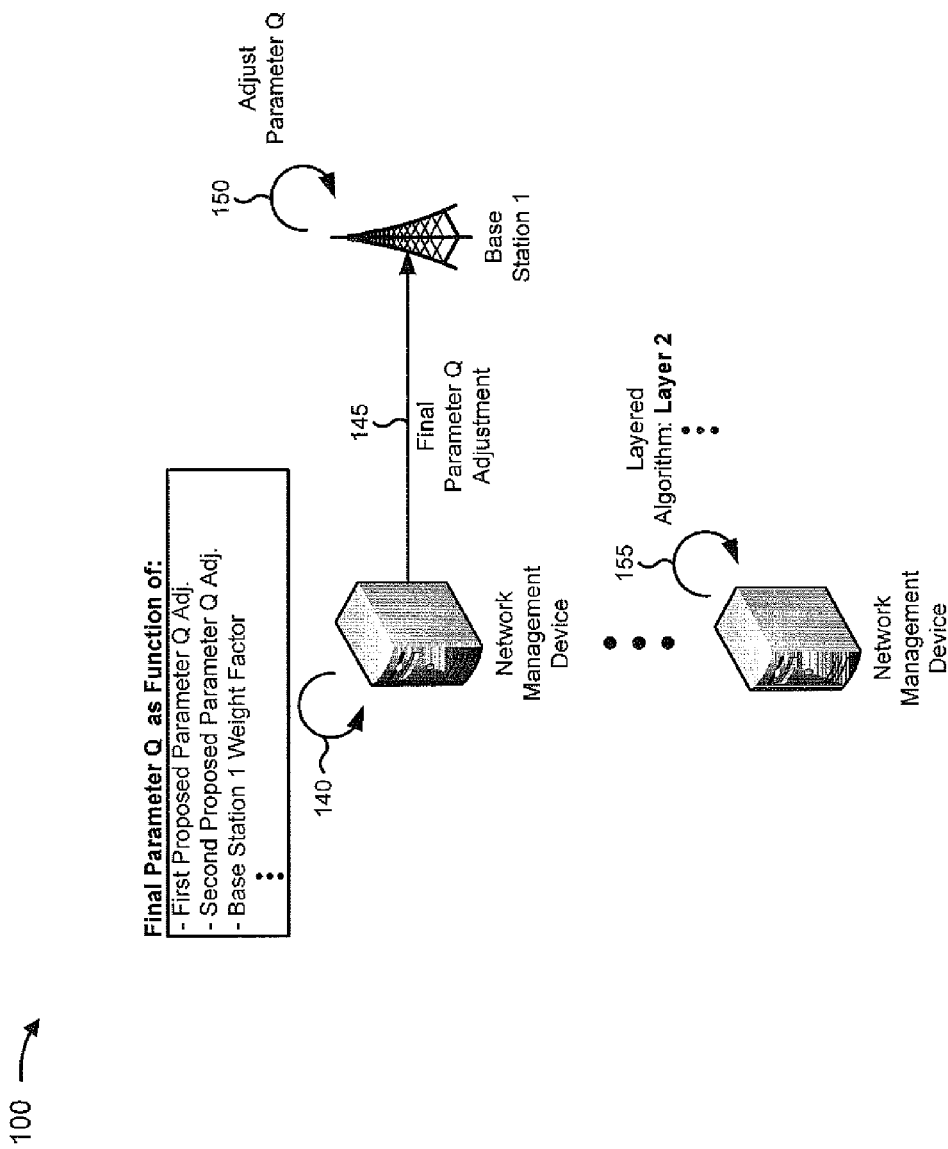

FIGS. 1A and 1B are diagrams of an overview of an example implementation 100 described herein. For the purposes of example implementation 100, assume that a network management device, included in a network, is configured to execute a layered optimization algorithm associated with the optimizing the network, and that the network management device is currently executing a first layer (e.g., layer 1) of the layered optimization algorithm. Further, assume that the network includes a group of base stations (e.g., base station 1 through base station X), and that a base station information device stores parameter information associated with the group of base stations.

As shown in FIG. 1A, and by reference number 105, a collection device, associated with the network, may collect performance information associated with the group of base stations. As shown by reference number 110, the collection device may provide the performance information to the network management device. As shown by reference number 115, the network management device may receive the performance information, and may use the performance information as input for layer 1 of the layered optimization algorithm. As shown, the network management device may determine, based on executing layer 1 of the layered optimization algorithm, that a network event has occurred (e.g., a layer 1 event), and the network management device may determine, based on determining that the layer 1 event has occurred, that a parameter (e.g., parameter Q), associated with a particular base station (e.g., base station 1) is to be adjusted (e.g., in order to improve network performance associated with layer 1).

As shown by reference number 120, the network management device may determine (e.g., based on a centralized SON algorithm executed by the network management device) a first proposed parameter Q adjustment for parameter Q of base station 1. As shown by reference number 125, the network management device may receive, from base station 1 (e.g., and based on a distributed SON algorithm executed by base station 1), a second proposed parameter Q adjustment for parameter Q of base station 1. As shown by reference number 130, the network management device may also receive, from the base station information device, the parameter information associated with base station 1 through base station X, and, as shown by reference number 135, may determine a weight factor associated with base station 1.

As shown in FIG. 1B, and by reference number 140, the network management device may determine a final parameter Q adjustment as a function of the first proposed parameter Q adjustment, the second proposed parameter Q adjustment, and the base station 1 weight factor. As shown by reference number 145, the network management device may provide the final parameter Q adjustment to base station 1, and, as shown by reference number 150, base station 1 may adjust parameter Q based on the final parameter Q adjustment provided by the network management device. As shown by reference number 155, the network management device may proceed to another layer of the layered optimization algorithm (e.g., layer 2), and may continue optimizing the network. In some implementations, the layered optimization algorithm may contain multiple layers, and each layer may cause one or more parameters, associated with one or more base stations, to be adjusted (e.g., based on corresponding centralized SON algorithms and distributed SON algorithms), in the manner described above, before proceeding to a next layer of the layered optimization algorithm.

In this way, a dynamic control mechanism may integrate parameter adjustments, provided by a network management device (e.g., a centralized SON algorithm) and a base station (e.g., a distributed SON algorithm), such that the parameter adjustments do not conflict, require either SON algorithm to be overridden, or require either SON algorithm to be disabled.

Figure 2:
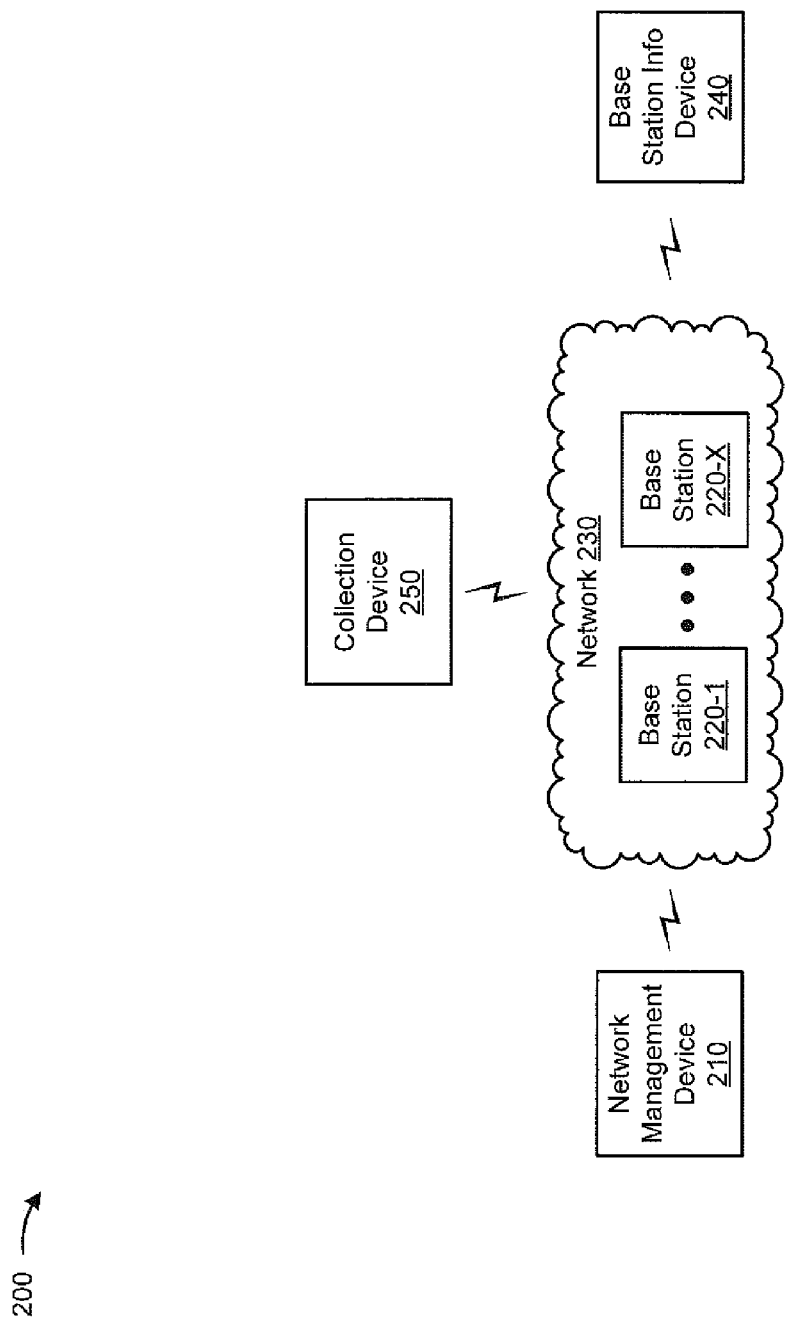
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network management device 210, one or more base stations 220-1 through 220-X (herein referred to collectively as base stations 220, and individually as base station 220), a network 230, a base station information device 240, and a collection device 250. Devices of environment 200 may interconnect via wired connections, wireless connections, or a combination of wired and wireless connections.

Network management device 210 may include a device capable of receiving, generating, storing, processing, and/or providing information associated with a centralized SON algorithm associated with network 230. For example, network management device 210 may include a server device and/or a collection of server devices. In some implementations, network management device 210 may be capable of receiving performance information (e.g., associated with one or more base stations 220), and determining (e.g., based on a centralized SON algorithm associated with network management device 210) a proposed parameter adjustment associated with base station 220. Additionally, or alternatively, network management device 210 may host a control module associated with determining a final parameter adjustment based on a first proposed parameter adjustment, associated with the centralized SON algorithm, and a second proposed parameter adjustment associated with a distributed SON algorithm (e.g., implemented by base station 220). Additionally, or alternatively, network management device 210 may be capable of executing a layered optimization algorithm associated with optimizing a performance of base stations 220 and/or network 230.

Base station 220 may include one or more devices capable of transferring traffic, such as audio, video, text, and/or other traffic. In some implementations, base station 220 may include an eNodeB (eNB) associated with a long term evolution (LTE) network that receives traffic from and/or sends traffic via network 230. Additionally, or alternatively, one or more base stations 220 may be associated with a radio access network (RAN) that is not associated with the LTE network. Base station 220 may send traffic to and/or receive traffic via an air interface. In some implementations, base station 220 may include a small cell base station, such as a base station of a microcell, a picocell, and/or a femtocell.

In some implementations, base station 220 may be capable of determining performance information (e.g., associated with one or more base stations 220), and determining (e.g., based on a distributed SON algorithm associated with base station 220) a proposed parameter adjustment associated with base station 220. Additionally, or alternatively, base station 220 may host a control module associated with determining a final parameter adjustment based on a first proposed parameter adjustment, associated with the centralized SON algorithm (e.g., executed by network management device 210), and a second proposed parameter adjustment associated with the distributed SON algorithm.

Network 230 may include one or more wired and/or wireless networks. For example, network 230 may include a cellular network (e.g., an LTE network, a third generation (3G) network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

Base station information device 240 a device capable of receiving, generating, storing, processing, and/or providing parameter information associated with base stations 220. For example, base station information device 240 may include a server device and/or a collection of server devices. In some implementations, base station information device 240 may be capable of receiving, determining, storing and/or providing a weight factor, associated with base station 220, based on characteristic information associated with base station 220.

Collection device 250 may include a device capable of receiving, processing, storing, and/or providing performance information associated with base stations 220 included in network 230. For example, collection device 250 may include a server device and/or a collection of server devices. In some implementations, collection device 250 may provide performance information, associated with one or more base stations 220, to network management device 210 and/or base station 220.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
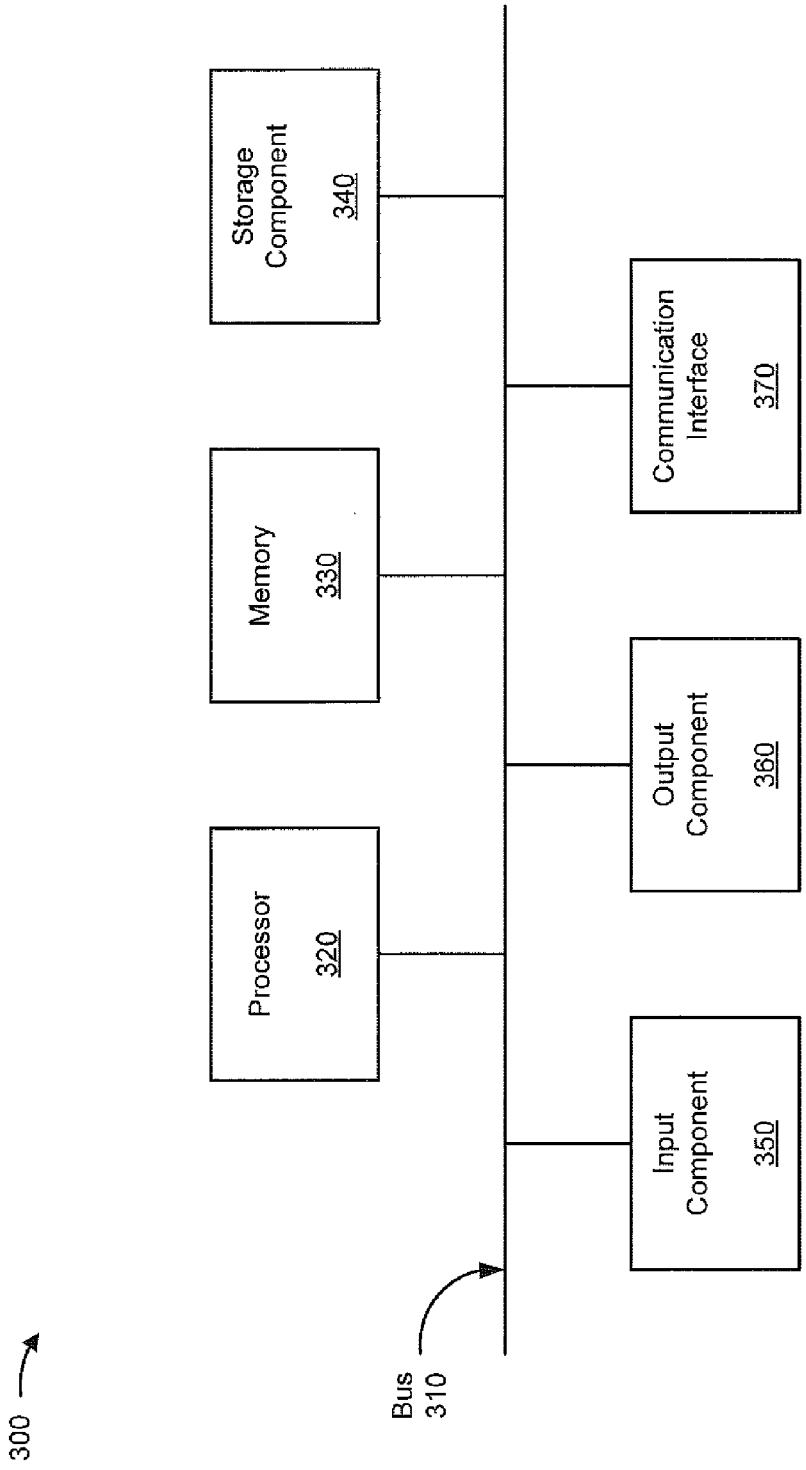
FIG. 3 is a diagram of example components of one or more devices of FIG. 2.

FIG. 3 is a diagram of example components of a device 300. Device 300 may correspond to network management device 210, base station 220, base station information device 240, and/or collection device 250. In some implementations, network management device 210, base station 220, base station information device 240, and/or collection device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
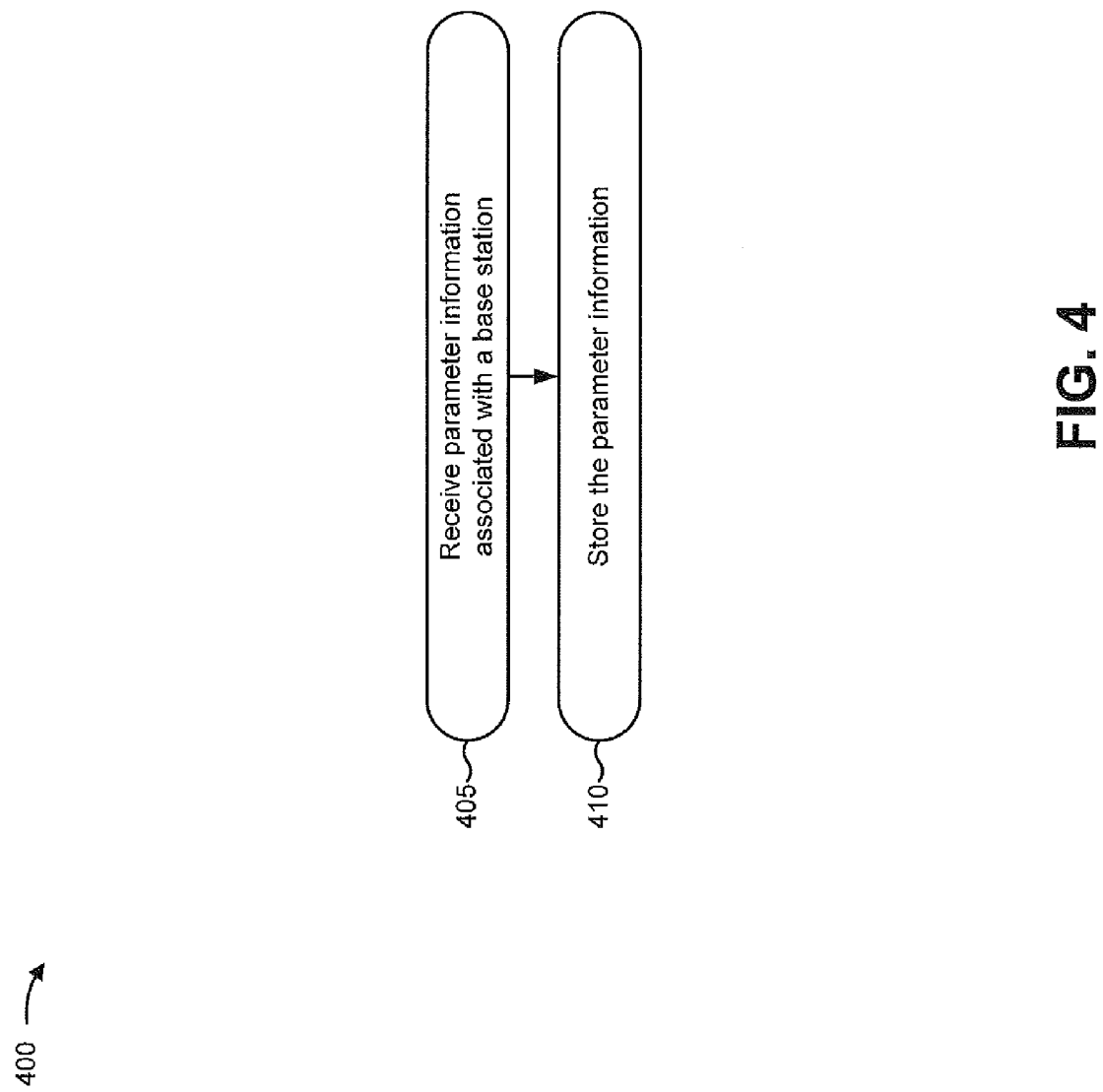
FIG. 4 is a flow chart of an example process for receiving and storing parameter information associated with a base station.

FIG. 4 is a flow chart of an example process 400 for receiving and storing parameter information associated with a base station. In some implementations, one or more process blocks of FIG. 4 may be performed by base station information device 240. Additionally, or alternatively, one or more process blocks of FIG. 4 may be performed by another device or a group of devices separate from or including base station information device 240, such as network management device 210, base station 220, and/or collection device 250.

As shown in FIG. 4, process 400 may include receiving parameter information associated with a base station (block 405). For example, base station information device 240 may receive parameter information associated with base station 220. In some implementations, base station information device 240 may receive the parameter information when base station 220 provides the parameter information. Additionally, or alternatively, base station information device 240 may receive the parameter information when another device provides the parameter information, such as network management device 210 and/or collection device 250.

Parameter information, associated with base station 220, may include information associated with a base station 220 and/or information associated with a relationship between base station 220 and a neighbor base station 220 of base station 220. For example, the parameter information may include information that identifies base station 220 (e.g., a base station identifier, a cell identifier, etc.), information that identifies a neighbor base station 220 (e.g., a neighbor base station identifier, a neighbor cell identifier, etc.), information that identifies a distance between base station 220 and the neighbor base station 220 (e.g., miles, kilometers, etc.), information that identifies a radio frequency (RF) characteristic associated with radio communications between base station 220 and the neighbor base station 220 (e.g., a path loss, a received signal strength, a signal to noise ratio (SINR), a network loading characteristic, an inter-frequency path-loss discrepancy, an operator bias, a restricted value, a default value, etc.), information associated with a parameter of base station 220 and/or the relationship between base station 220 and the neighbor base station 220 (e.g., a handover parameter value, such as an A3 offset value, an A3 hysterisis value, a cell individual offset value, a time to trigger value, etc.), information that identifies a parameter threshold of the parameter (e.g., a maximum parameter value, a minimum parameter value, etc.) and/or another type of information associated with a base station 220 and/or a neighbor base station 220 of base station 220. Additionally, or alternatively, the parameter information may include a weight factor associated with base station 220 and the neighbor base station 220. Creating a weight factor is described in further detail below.

In some implementations, base station information device 240 may receive the parameter information from base station 220. For example, base station 220 may store the parameter information, and may provide (e.g., periodically, when a parameter of base station 220 is adjusted, etc.) the parameter information to base station information device 240. Additionally, or alternatively, base station information device 240 may receive the parameter information from network management device 210. For example, network management device 210 may determine one or more weight factors associated with base station 220, as described below, and network management device 220 may provide the one or more weight factors to base station information device 240. In some implementations, base station information device 240 may determine the weight factor, as described below, based on the parameter information. Additionally, or alternatively, base station information device 240 may receive the parameter information based on user input. For example, a user (e.g., a network administrator) may provide input associated with the parameter information to base station information device 240 (e.g., via network management device 210, via another device, etc.).

As further shown in FIG. 4, process 400 may include storing the parameter information (block 410). For example, base station information device 240 may store the parameter information. In some implementations, base station information device 240 may store the parameter information when base station information device 240 receives the parameter information. Additionally, or alternatively, base station information device 240 may store the parameter information based on information, indicating that base station information device 240 is to store the parameter information, received from another device, such as network management device 210 and/or base station 220.

In some implementations, base station information device 240 may store the parameter information in a memory location (e.g., a RAM, a ROM, a cache, a hard disk, etc.) of base station information device 240. Additionally, or alternatively, base station information device 240 may provide the parameter information to another device for storage. In some implementations, base station information device 240 may store information associated with the parameter information such that previous parameter information (e.g., stored at an earlier time) is overwritten, modified, and/or deleted. Additionally, or alternatively, base station information device 240 may store the parameter information such that base station information device 240 may retrieve the parameter information at a later time (e.g., in order to provide the parameter information to network management device 210).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
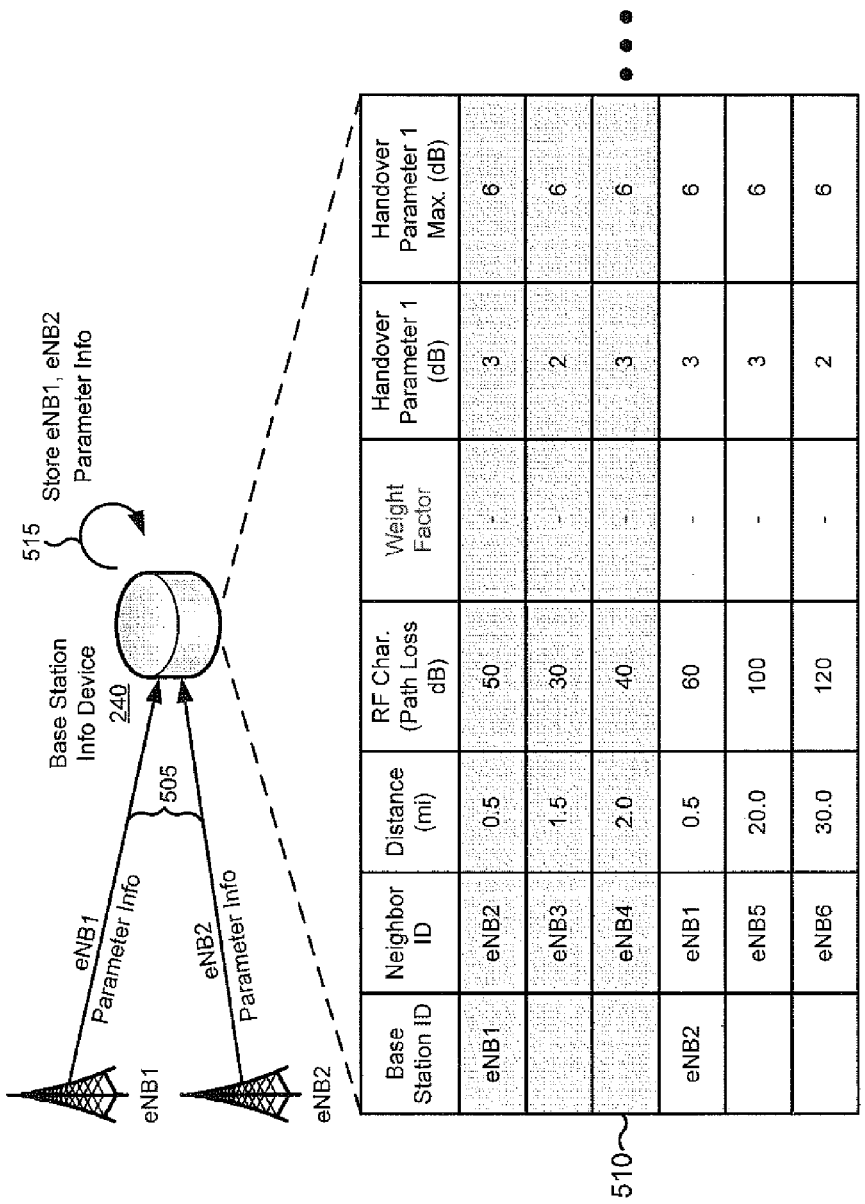
FIG. 5 is a diagram of an example implementation relating to the example process shown in FIG. 4.

FIG. 5 is a diagram of an example implementation 500 relating to example process 400 shown in FIG. 4. For the purposes of FIG. 5, assume that network 230 includes a group of base stations 220, identified as eNB1 through eNB6. Further, assume that neighbor base stations 220 of eNB1 include eNB2, eNB3, and eNB4, and that neighbor base stations 220 of eNB2 include eNB1, eNB5, and eNB6. Finally, assume eNB1 and eNB2 have provided (e.g., based on a configuration of eNB1 and eNB2) parameter information associated with eNB1 and eNB2, respectively.

As shown in FIG. 5, and by reference number 505, base station information device 240 may receive, from eNB1 and eNB2, the eNB1 parameter information and the eNB2 parameter information. As shown by reference number 510, the eNB1 parameter information, may include a base station identifier, information that identifies neighbor base stations 220 of eNB1 (e.g., eNB2, eNB3, eNB4), information that identifies a distance between eNB1 and each of eNB2, eNB3, and eNB4, an RF characteristic (e.g., a path loss) associated with radio communications between enB1 and each of eNB2, eNB3, and eNB4, a handover parameter (e.g., handover parameter 1) value associated with eNB1 and each of eNB2, eNB3, and eNB4, information that identifies a parameter value threshold (e.g., handover parameter 1 maximum) of the handover parameter value, etc.

Similarly, the eNB2 parameter information, may include a base station identifier, information that identifies neighbor base stations 220 of eNB2 (e.g., eNB1, eNB5, eNB6), information that identifies a distance between eNB2 and each of eNB1, eNB5, and eNB6, an RF characteristic (e.g., a path loss) associated with radio communications between eNB2 and each of eNB1, eNB5, and eNB6, a handover parameter (e.g., handover parameter 1) value associated with eNB2 and each of eNB1, eNB5, and eNB6, information that identifies a parameter value threshold (e.g., handover parameter 1 maximum) of the handover parameter value, etc. In some implementations, the parameter information may include information associated with additional and/or different parameters associated with eNB1 and/or eNB2 (not shown).

As shown by reference number 515, base station information device 240 may store the eNB1 parameter information and the eNB2 parameter information.

As indicated above, FIG. 5 is provided merely as an example. Other examples are possible and may differ from what was described with regard to FIG. 5.

Figure 6A:
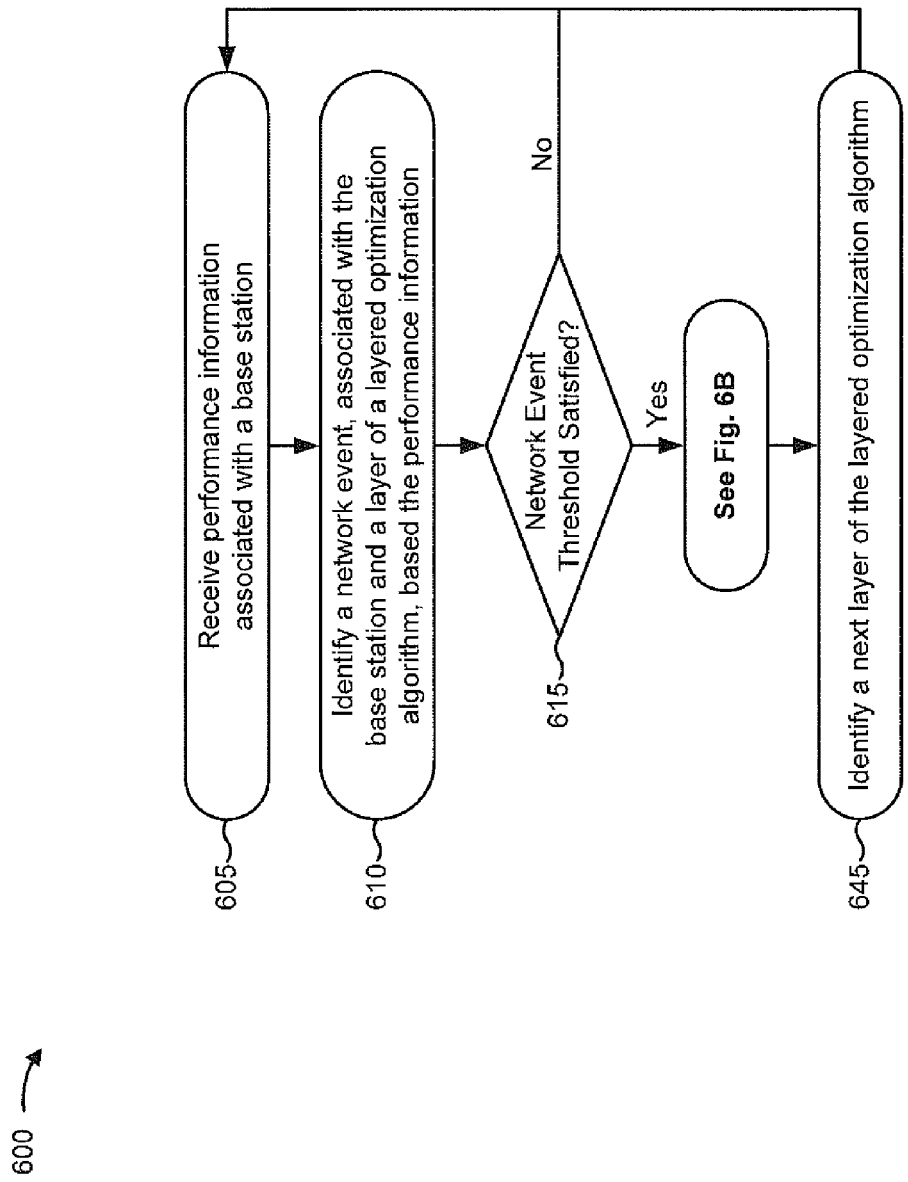

FIGS. 6A and 6B are flow charts of an example process 600 for determining a final parameter adjustment, associated with a parameter of a base station, based on a first proposed parameter adjustment, associated with a centralized SON algorithm, and a second proposed parameter adjustment associated with a distributed SON algorithm. In some implementations, one or more process blocks of FIGS. 6A and 6B may be performed by network management device 210. Additionally, or alternatively, one or more process blocks of FIGS. 6A and 6B may be performed by another device or a group of devices separate from or including network management device 210, such as, base station 220, base station information device 240, and/or collection device 250.

As shown in FIG. 6A, process 600 may include receiving performance information associated with a base station (block 605). For example, network management device 210 may receive performance information associated with a base station. In some implementations, network management device 210 may receive the performance information when another device provides the performance information, such as collection device 250 and/or base station 220.

Performance information may include information associated with a performance of base stations 220 included in network 230. For example, the performance information may include information associated with throughput, a handover, a SINR, a radio signal strength, a dropped call, an access failure, etc. associated with user devices communicating via base station 220. In some implementations, as described above, collection device 250 may receive, process, and/or store the performance information (e.g., collection device 250 may be configured to collect performance information associated with multiple base stations 220), and collection device 250 may provide (e.g., in near real-time, periodically, based on a request from network management device 210, etc.) the performance information to network management device 210. In some implementations, the performance information may be used by a centralized SON algorithm, as described below, to identify a network event that may result in a parameter of base station 220 being adjusted. In some implementations, network management device 210 may receive performance information associated with multiple base stations 220.

As further shown in FIG. 6A, process 600 may include identifying a network event, associated with the base station and a layer of a layered optimization algorithm, based the performance information (block 610). For example, network management device 210 may identify a network event, associated with the base station and a layer of a layered optimization algorithm, based the performance information. In some implementations, network management device 210 may identify the network event after network management device 210 receives the performance information. Additionally, or alternatively, network management device 210 may identify the network event when network management device 210 executes the layer of the layered optimization algorithm, as described below.

A network event may include an event, associated with base station 220, that may trigger a parameter, associated with base station 220, being adjusted (e.g., in order to optimize a performance of network 230, base station 220 and/or another base station 220). For example, the network event may include a handover associated with base station 220, a dropped call associated with base station 220, an access failure associated with base station 220, an amount of resource utilization, an amount of throughput, and/or another type of network event. In some implementations, network management device 210 may identify the network event based on the performance information. For example, network management device 210 may process, analyze, and/or monitor performance information received from collection device 250 in order to identify the network event. In some implementations, network management device 210 may identify the network event based on executing a layer of a layered optimization algorithm.

A layered optimization algorithm may include an algorithm (e.g., executed by network management device 210) associated with optimizing a performance of network 230. In some implementations, a layer of the layered optimization algorithm may be designed such that network management device 210 causes one or more parameters of one or more base stations 220 to be adjusted when a network event, associated with the layer, is identified by network management device 210. For example, assume that a layered optimization algorithm includes three layers: a load balancing layer, a coverage layer, and a dropped call layer. In this example, if network management device 210, while executing the load balancing layer, identifies a first network event (e.g., a 90% resource utilization for base station 220), then network management device 210 may determine that a parameter (e.g., a cell individual offset parameter), associated with base station 220, is to be adjusted. Here, after network management device 210 causes the parameter to be adjusted (e.g., as described below with regard to FIG. 6B), network management device 210 may execute the next layer (e.g., the coverage layer) of the layered optimization algorithm (e.g., and may proceed with executing the dropped call layer of the layered optimization algorithm after executing the coverage layer).

In some implementations, the layer may be associated with one or more network events (e.g., one or more network events may be identified during the execution of the layer). Additionally, or alternatively, a first layer and a second layer may be associated with the same one or more network events and/or one or more different network events. In some implementations, the layer may be associated with one or more parameters (e.g., network management device 210 may determine that one or more parameters are to be adjusted based on executing the layer). Additionally, or alternatively, a first layer and a second layer may be associated with the same one or more parameters and/or one or more different parameters. In some implementations, network management device 210 may execute a final layer of the layered optimization algorithm, and may return to an initial layer of the layered optimization algorithm (e.g., such that the layered optimization algorithm repeats).

As further shown in FIG. 6A, process 600 may include determining whether a network event threshold, associated with the network event, has been satisfied (block 615). For example, network management device 210 may determine whether a network event threshold, associated with the network event, has been satisfied. In some implementations, network management device 210 may determine whether the network event threshold has been satisfied after network management device 210 identifies the network event associated with base station 220 and the layer of the layered optimization algorithm. Additionally, or alternatively, network management device 210 may determine whether the network event threshold has been satisfied when network management device 210 receives information indicating that network management device 210 is to determine whether the network event threshold has been satisfied.

A network event threshold may include a threshold, associated with a network event, that, when satisfied, causes network management device 210 to determine that a parameter, associated with base station 220, is to be adjusted. For example, the network event threshold may include a quantity of handovers associated with base station 220, a quantity of dropped calls associated with base station 220, a quantity of access failures associated with base station 220, a particular amount of resource utilization, a particular amount of throughput, and/or another type of information.

In some implementations, network management device 210 may determine whether the network event threshold has been satisfied based on identifying the network event. For example, network management device 210 may identify that a handover, associated with base station 220 has occurred, and may determine (e.g., based on information stored by network management device 210) that 950 total handovers, associated with base station 220, have been identified. In this example, if the handover threshold is 1000 handovers, then network management device 210 may determine that the handover threshold has not been satisfied, and may continue receiving performance information associated with base station 220.

As another example, network management device 210 may identify that a handover, associated with base station 220 has occurred, and may determine (e.g., based on information stored by network management device 210) that 1000 total handovers, associated with base station 220, have been identified. In this example, if the handover threshold is 1000 handovers, then network management device 210 may determine that the handover threshold has been satisfied, and network device 210 may determine that a parameter, associated with base station 220, is to be adjusted, as described below.

Additionally, or alternatively, the network event threshold may be associated with a period of time. For example, a network event threshold may indicate that one or more parameters, associated with base station 220, are to be adjusted when network management device 210 identifies 1000 handovers or when two hours have passed since network management device 210 last determined that the one or more parameters have been adjusted (e.g., whichever occurs first). In this way, network management device 210 may proceed with executing the layer of the layered optimization algorithm even when a particular quantity of network events, associated with the layer, have not been identified.

As further shown in FIG. 6A, if the network event threshold has not been satisfied (block 615—NO), then process 600 may return to block 605. For example, network management device 210 may determine that the network event threshold has not been satisfied, and network management device 210 may continue receiving performance information associated with base station 220, as described above.

As further shown in FIG. 6A, if the network event does satisfy the network event threshold (block 615—YES), then process 600 may include determining a weight factor associated with the base station (as shown in block 620 in FIG. 6B). For example, network management device 210 may determine that the network event threshold has been satisfied (e.g., indicating that a parameter of base station 220 is to be adjusted), and network management device 210 may determine a weight factor associated with base station 220.

A weight factor may include a value (e.g., a numerical value between zero and one) that is to be applied (e.g., by network management device 210) to a proposed parameter adjustment for a parameter of base station 220 when determining a final parameter adjustment for the parameter. For example, a proposed parameter adjustment may be multiplied by the weight factor, and the result may be added to another proposed parameter adjustment in order to determine a final parameter adjustment.

In some implementations, the weight factor may be applied to a proposed parameter adjustment determined based on a centralized SON algorithm associated with base station 220 (herein referred to as a first proposed parameter adjustment). A centralized SON algorithm may include an algorithm associated with optimizing, configuring, updating, managing, etc. multiple base stations 220 included network 230. In other words, the centralized SON algorithm may be designed to allow network management device 210 to perform network-wide optimization for multiple base stations 220. In some implementations, the centralized SON algorithm may be associated with a particular network event and/or a particular parameter. For example, the centralized SON algorithm may be designed such that network management device 210 may propose (e.g., based on performance information associated with multiple base stations 220) an adjusted cell individual offset parameter, associated with base station 220, when network management device 210 determines that a handover threshold, associated with base station 220, has been satisfied. Additionally, or alternatively, the centralized SON algorithm may be associated with one or more network events and/or one or more parameters of base stations 220.

In some implementations, the weight factor may be applied to a proposed parameter adjustment determined based on a distributed SON algorithm (herein referred to as a second proposed parameter adjustment). A distributed SON algorithm may include an algorithm associated with optimizing, configuring, updating, managing, etc. base station 220 (e.g., and/or a neighbor base station 220 of base station 220) included in network 230. In other words, the distributed SON algorithm may be designed to allow base station 220 to perform optimization of base station 220 and/or a number of neighbor base stations 220. In some implementations, each base station 220, included in network 230, may execute a corresponding distributed SON algorithm (e.g., whereas network management device 210 may execute a centralized SON algorithm associated with many and/or all base stations 220 included in network 230). In some implementations, the distributed SON algorithm may be associated with a particular network event and/or a particular parameter. For example, the distributed SON algorithm may be designed to allow base station 220 to propose (e.g., based on performance information associated with base station 220) an adjusted cell individual offset parameter, associated with base station 220, when network management device 210 determines that a handover threshold, associated with base station 220, has been satisfied. Additionally, or alternatively, the distributed SON algorithm may be associated with one or more network events and/or one or more parameters of base station 220.

As discussed in further detail below, in some implementations, the centralized SON algorithm, when executed, may provide a first proposed parameter adjustment for a parameter of base station 220, and the distributed SON algorithm, when executed, may provide a second (e.g., conflicting, different, etc.) proposed parameter adjustment for the parameter of base station 220. In such a case, the weight factor may be applied to the first proposed parameter adjustment or the second proposed parameter adjustment to allow network management device 210 to determine a final parameter adjustment.

In some implementations, network device 210 may determine the weight factor based on the parameter information associated with base station 220. For example, network device 210 may receive (e.g., from base station information device 240) information that identifies a distance between base station 220 and a group of neighbor base stations 220, and information that identifies RF characteristics associated with base station 220 and the group of neighbor base stations 220. In this example, network device 210 may determine, based on a weight factor equation (e.g., stored by network device 210) that uses the distances and the RF characteristics as input and provides, as output, a weight factor to be applied to a proposed parameter adjustment (e.g., a first proposed parameter adjustment, a second proposed parameter adjustment). In this way, in some implementations, network management device 210 may determine the weight factor by calculating the weight factor, and network management device 210 may provide the weight factor to base station information device 240 for storage. Additionally, or alternatively, base station information device 240 may determine the weight factor (e.g., in the manner described above), may store the weight factor, and may provide the weight factor to network management device 210.

In some implementations, network management device 210 may determine the weight factor such that more weight is to be applied to the first proposed parameter adjustment (e.g., when one or more neighbor base stations 220 of base station 220 have a significant impact on a performance of base station 220). For example, network management device 210 may determine the weight factor such that more weight is to be applied to the first proposed parameter adjustment when base station 220 is physically located near the neighbor base stations 220 and/or when a path loss between base station 220 and the neighbor base stations 220 satisfies a threshold. In other words, in some implementations, network management device 210 may determine the weight factor such that more weight is applied to the first proposed parameter adjustment (e.g., associated with the centralized SON algorithm) when an inter-site relationship, associated with a group of base stations 220, is strong.

Additionally, or alternatively, network management device 210 may determine the weight factor such that less weight is to be applied to the first proposed parameter adjustment (e.g., when neighbor base stations 220 of base station 220 do not have a significant impact on a performance of base station 220). For example, network management device 210 may determine the weight factor such that less weight is to be applied to the first proposed parameter adjustment when base station 220 is physically located far from the neighbor base stations 220 and/or when the path loss between base station 220 and the neighbor base stations 220 is high. In other words, in some implementations, network management device 210 may determine the weight factor such that less weight is applied to the first proposed parameter adjustment when the inter-site relationship, associated with one or more base stations 220, is weak.

In some implementations, network management device 210 may determine whether the weight factor satisfies a weight factor threshold. For example, network management device 210 may store information that identifies a weight factor threshold (e.g., a minimum weight factor, a maximum weight factor) and network management device 210 may determine whether the weight factor satisfies the threshold. If the weight factor does not satisfy the threshold, network management device 210 may determine another weight factor (e.g., based on another equation stored by network management device 210) and/or may set the weight factor as being equal to the minimum weight factor or the maximum weight factor.

While implementations and examples described herein are described in the context of a weight factor being applied to the first proposed parameter adjustment (e.g., associated with a centralized SON algorithm), in some implementations, the weight factor may be applied to the second proposed parameter adjustment (e.g., associated with a distributed SON algorithm). Additionally, or alternatively, network management device 210 may determine a first weight factor, associated with the first proposed parameter adjustment, and a second weight factor associated with the second proposed parameter adjustment, and network management device 210 may apply one and/or both weight factors when determining a final parameter adjustment.

As further shown in FIG. 6B, process 600 may include determining a first proposed parameter adjustment, associated with a parameter of the base station, based on a centralized SON algorithm (block 625). For example, network management device 210 may determine a first proposed parameter adjustment, associated with a parameter of the base station, based on the centralized SON algorithm. In some implementations, network management device 210 may determine the first proposed parameter adjustment after network management device 210 determines the weight factor associated with the base station. Additionally, or alternatively, network management device 210 may determine the first proposed parameter adjustment when network management device 210 determines the network event threshold has been satisfied (e.g., indicating that the parameter of base station 220 is to be adjusted). Additionally, or alternatively, network management device 210 may determine the first proposed parameter adjustment when network management device 210 determines the second proposed parameter adjustment.

In some implementations, network management device 210 may determine the first proposed parameter adjustment based on executing the centralized SON algorithm. For example, assume that network management device 210 has determined that a handover threshold, associated with base station 220, has been satisfied, indicating that network management device 210 is to adjust a cell individual offset parameter of base station 220 in relation to another base station 220. In this example, network management device 210 may determine the first proposed cell individual offset parameter adjustment by providing performance information, associated with one or more base stations 220, as input to a centralized SON algorithm associated with determining a cell individual offset parameter for base station 220, and receiving, as output, the first proposed cell individual offset parameter adjustment associated with base station 220. In some implementations, the first proposed parameter value may be determined by another device and provided to network management device 210.

As further shown in FIG. 6B, process 600 may include determining a second proposed parameter adjustment, associated with the parameter of the base station, based on a distributed SON algorithm associated with the base station (block 630). For example, network management device 210 may determine a second proposed parameter adjustment, associated with the parameter of the base station, based on a distributed SON algorithm associated with the base station. In some implementations, network management device 210 may determine the second proposed parameter adjustment after network management device 210 determines the weight factor associated with the base station. Additionally, or alternatively, network management device 210 may determine the second proposed parameter adjustment when network management device 210 determines that the network event threshold has been satisfied. Additionally, or alternatively, network management device 210 may determine the second proposed parameter adjustment when network management device 210 determines the first proposed parameter adjustment.

In some implementations, network management device 210 may determine the second proposed parameter adjustment based on information received from base station 220. For example, assume that network management device 210 has determined that a handover threshold, associated with base station 220, has been satisfied, indicating that network management device 210 is to adjust a cell individual offset parameter of base station 220 in relation to another base station 220. In this example, network management device 210 may send, to base station 220, a request to provide the second proposed cell individual offset parameter adjustment (e.g., when base station 220 is configured to determine the second proposed cell individual offset parameter based on performance information associated with base station 220). In this example, base station 220 may determine the second proposed cell individual offset parameter by providing performance information, associated with base stations 220, as input to a distributed SON algorithm (e.g., associated with determining the cell individual offset parameter for base stations 220) hosted by base station 220. Base station 220 may receive, as output from the distributed SON algorithm, the second proposed cell individual offset parameter adjustment, associated with base station 220, and may provide the second proposed cell individual offset to network management device 210.

As further shown in FIG. 6B, process 600 may include determining a final parameter adjustment based on the weight factor, the first proposed parameter adjustment, and the second proposed parameter adjustment (block 635). For example, network management device 210 may determine a final parameter adjustment based on the weight factor, the first proposed parameter adjustment, and the second proposed parameter value. In some implementations, network management device 210 may determine the final parameter adjustment after network management device 210 determines the weight factor, the first proposed parameter adjustment, and the second proposed parameter adjustment. Additionally, or alternatively, network management device 210 may determine the final parameter adjustment when network management device 210 receives, from another device, information indicating that network management device 210 is to determine the final parameter adjustment.

A final parameter adjustment may include a weighted parameter adjustment, associated with base station 220, that integrates the first proposed parameter adjustment (e.g., associated with the centralized SON algorithm) and the second proposed parameter adjustment (e.g., associated with the distributed SON algorithm). In some implementations, network management device 210 may determine the final parameter adjustment by applying the weight factor to the first proposed parameter adjustment, and mathematically combining the weighted first proposed parameter adjustment with the second proposed parameter adjustment. For example, network management device may determine the final parameter adjustment by (1) multiplying the first proposed parameter adjustment by the weight factor and (2) adding the result of (1) to the second proposed parameter adjustment. Additionally, or alternatively, network management device 210 may determine the final parameter adjustment by applying the weight factor to the second proposed parameter adjustment, and mathematically combining the weighted second proposed parameter adjustment with the first proposed parameter adjustment.

Additionally, or alternatively, network management device 210 may determine the final parameter adjustment based on a previous proposed parameter adjustment (e.g., a parameter adjustment proposed at an earlier time) associated with the parameter. For example, network management device 210 may receive (e.g., from base station 220, from base station information device 240, etc.) information associated with a previous second proposed parameter adjustment (e.g., the most recent second proposed parameter adjustment) and network management device 210 may determine the final parameter adjustment based on the weight factor, the first proposed parameter adjustment, the second proposed parameter adjustment, and the previous second proposed parameter adjustment.

In some implementations, network management device 210 may determine whether the final parameter adjustment satisfies a parameter value threshold associated with the parameter. For example, network management device 210 may determine a final parameter adjustment, and may determine (e.g., based on information stored by network management device 210, based on information stored by base station information device 240, etc.) whether a current parameter value, if adjusted based on the final parameter adjustment, would satisfy a parameter value threshold. In this example, if the current parameter value would satisfy the parameter value threshold when adjusted based on the final parameter adjustment (e.g., if the adjusted parameter value would be less than or equal to a maximum parameter value, greater than or equal to a minimum parameter value, etc.), then network management device 210 may cause base station 220 to adjust the parameter based on the final parameter adjustment.

Alternatively, if the adjusted parameter value would not satisfy the parameter value threshold when adjusted based on the final parameter adjustment (e.g., if the adjusted parameter value would be greater than a maximum parameter value, less than a minimum parameter value, etc.), then network management device 210 may determine the final parameter adjustment such that the adjusted parameter value would not exceed the parameter value threshold. In some implementations, the parameter value threshold may be associated with the parameter. For example, if the adjusted parameter value is greater than a maximum parameter value, then network device 210 may determine the final parameter adjustment such that the adjusted parameter value will be equal to the maximum parameter value. As another example, if the adjusted parameter value is less than a minimum parameter value, then network device 210 may determine the final parameter adjustment such that the adjusted parameter value will be equal to the minimum parameter value.

Additionally, or alternatively, the parameter value threshold may be associated with a group of parameters associated with the parameter. For example, if the adjusted parameter value is greater than a first associated parameter value minus a second associated parameter value minus a third associated parameter value, then network device 210 may determine the final parameter adjustment such that the adjusted parameter value will be a value equal to the first associated parameter value minus the second associated parameter value minus the third associated parameter value.

As further shown in FIG. 6B, process 600 may include causing the parameter of the base station to be adjusted based on the final parameter adjustment (block 640). For example, network management device 210 may cause the parameter of base station 220 to be adjusted based on the final parameter adjustment. In some implementations, network management device 210 may cause the parameter of base station 220 to be adjusted after network management device 210 determines the final parameter adjustment.

In some implementations, network management device 210 may cause the parameter of base station 220 to be adjusted based on providing the final parameter adjustment to base station 220. For example, network management device 210 may determine the final parameter adjustment, and may provide the final parameter adjustment to base station 220. In this example, base station 220 may receive the final parameter adjustment, and may adjust the parameter accordingly.

In this way, network management device 210 may integrate parameter adjustments provided by network management device 210 (e.g., a centralized SON algorithm) and base station 220 (e.g., a distributed SON algorithm), such that the parameter adjustments do not conflict, require one SON algorithm to override another SON algorithm, or require either SON algorithm to be disabled.

Process 600 may include identifying a next layer of the layered optimization algorithm (as shown in block 645 of FIG. 6A). For example, network management device 210 may identify a next layer of the layered optimization algorithm. In some implementations, network management device 210 may identify the next layer after network management device 210 causes the parameter of base station 220 to be adjusted based on the final parameter adjustment. Additionally, or alternatively, network management device 210 may identify the next layer when network management device 210 receives (e.g., from another device) information indicating network management device 210 is to identify the next layer.

In some implementations, network management device 210 may identify a next layer as a subsequent layer (e.g., another layer that follows the layer of the layered optimization algorithm), and network management device 210 may execute the subsequent layer of the layered optimization algorithm. For example, network management device 210 may determine that the layered optimization algorithm includes a subsequent layer, and network management device 210 may execute the subsequent layer of the algorithm by returning to block 605 and proceeding as described above.

Additionally, or alternatively, network management device 210 may identify the next layer as an initial layer of the layered optimization algorithm, and network management device 210 may process the initial layer of the layered optimization algorithm. For example, network management device 210 may determine that the layered optimization algorithm does not include a subsequent layer, network management device 210 may identify an initial layer of the layered optimization algorithm, and may execute the initial layer of the layered optimization algorithm by returning to block 605 and proceeding as described above. In this way, network management device 210 may repeatedly execute the layered optimization algorithm (e.g., such that parameters of base stations 220 are continuously adjusted) based on the layered optimization algorithm.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example implementation 700 relating to example process 600 shown in FIGS. 6A and 6B. FIGS. 7A-7D show an example of determining a final parameter adjustment, associated with a parameter of a base station, based on a first proposed parameter adjustment, associated with a centralized SON algorithm, and a second proposed parameter adjustment associated with a distributed SON algorithm. For the purposes of example implementation

700, assume that a group of base stations 220 (e.g., eNB1 through eNB6) are included in a network 230.

Figure 7A:
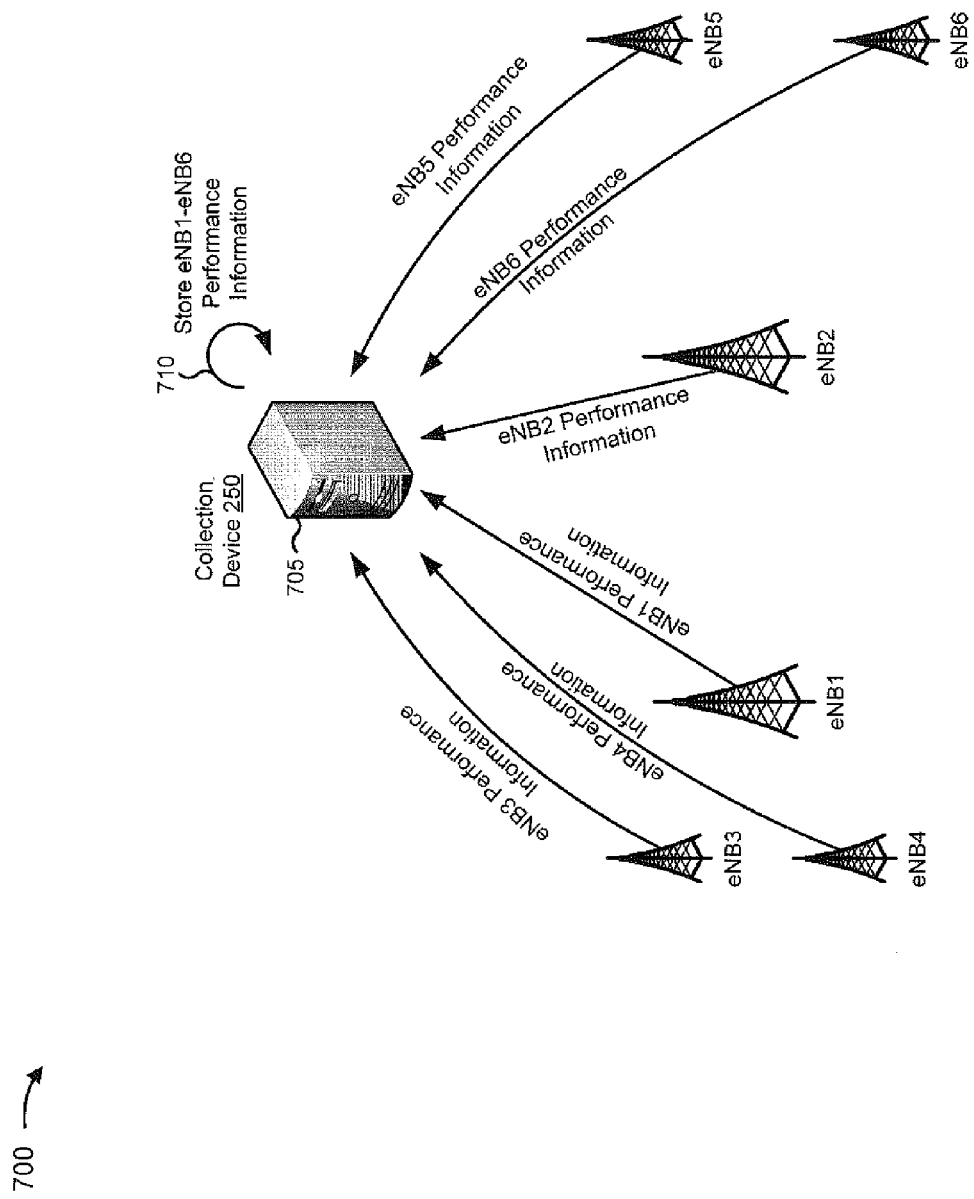
FIGS. 7A-7D are diagrams of an example implementation relating to the example process shown in FIGS. 6A and 6B.

As shown in FIG. 7A, and by reference number 705, collection device 250 may receive performance information from eNB1 through eNB6, and, as shown by reference number 710, collection device 250 may store the performance information associated with eNB1 through eNB6.

Figure 7B:
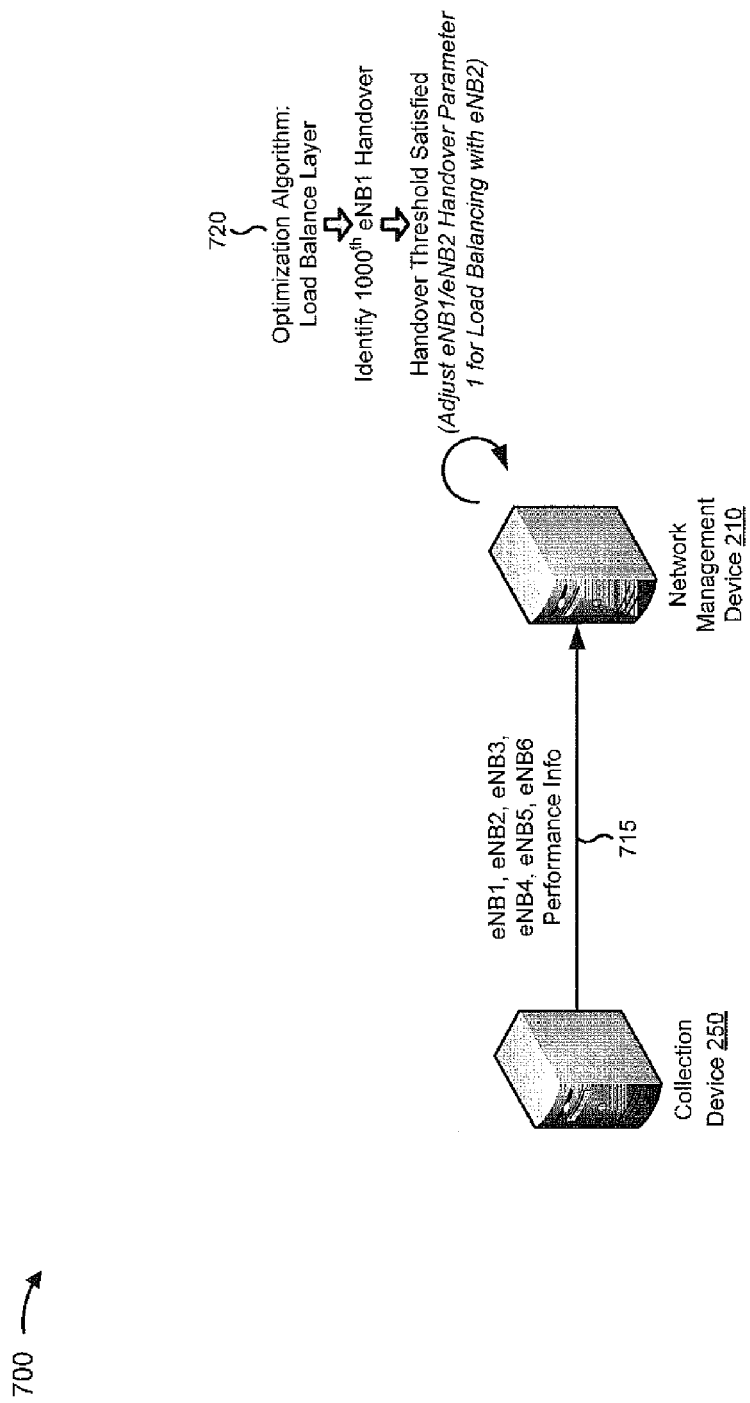

For the purposes of FIG. 7B, assume that network management device 210, associated with network 230, is configured to execute a layered optimization algorithm (e.g., associated with optimizing network 230), and that network management device 210 is currently executing a load balancing layer of the layered optimization algorithm. As shown by reference number 715, collection device 250 may provide (e.g., in near-real time) the performance information, associated with eNB1 through eNB6, to network management device 210.

As shown by reference number 720, assume that, in accordance with the load balancing layer of the layered optimization algorithm, network management device 210 monitors (e.g., based on the performance information) user devices being handed over to eNB1 (e.g., from eNB2, from eNB3, from eNB4, etc.), and that network management device 210 determines that the handover threshold, associated with the load balancing layer of the layered optimization algorithm, is satisfied when the one thousandth handover occurs (e.g., within a particular time period). As shown, network device 210 may determine (e.g., based on executing the load balancing layer), that network management device 210 is to adjust a handover parameter of eNB1 (e.g., eNB1/eNB2 handover parameter 1) to perform load balancing between eNB1 and eNB2.

Figure 7C:
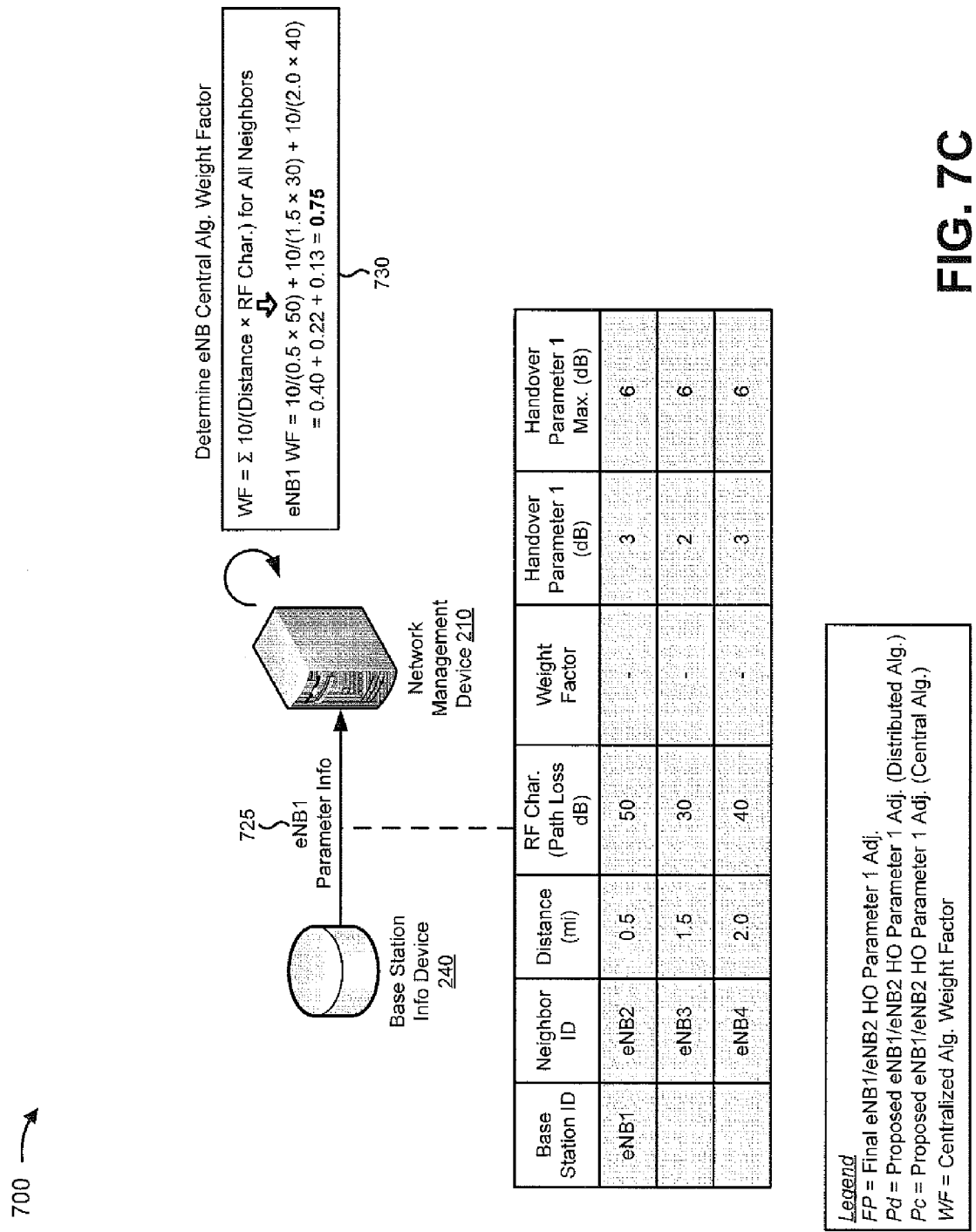

For the purposes of FIG. 7C, assume that base station information device 240 stores parameter information associated with eNB1 (e.g., not including a weight factor associated with eNB1). As shown by reference number 725, base station information device 240 may provide (e.g., based on a request from network management device 210) the eNB1 parameter information. As shown by reference number 730, network management device 210 may determine, based on the eNB1 parameter information, a weight factor that is to be applied to a proposed eNB1/enB2 handover parameter 1 adjustment provided by a centralized SON algorithm. As shown by reference number 730, the weight factor may be calculated (e.g., based on a weight factor equation stored by network management device) as being equal to 0.75. In some implementations, network management device 210 may provide the eNB1 weight factor (e.g., 0.75), a component of the weight factor associated with the relationship between eNB1 and eNB2 (e.g., 0.40), a component of the weight factor associated with the relationship between eNB1 and eNB3 (e.g., 0.22), and/or a component of the weight factor associated with the relationship between eNB1 and eNB4 (e.g., 0.13) to base station information device 240 for storage.

Figure 7D:
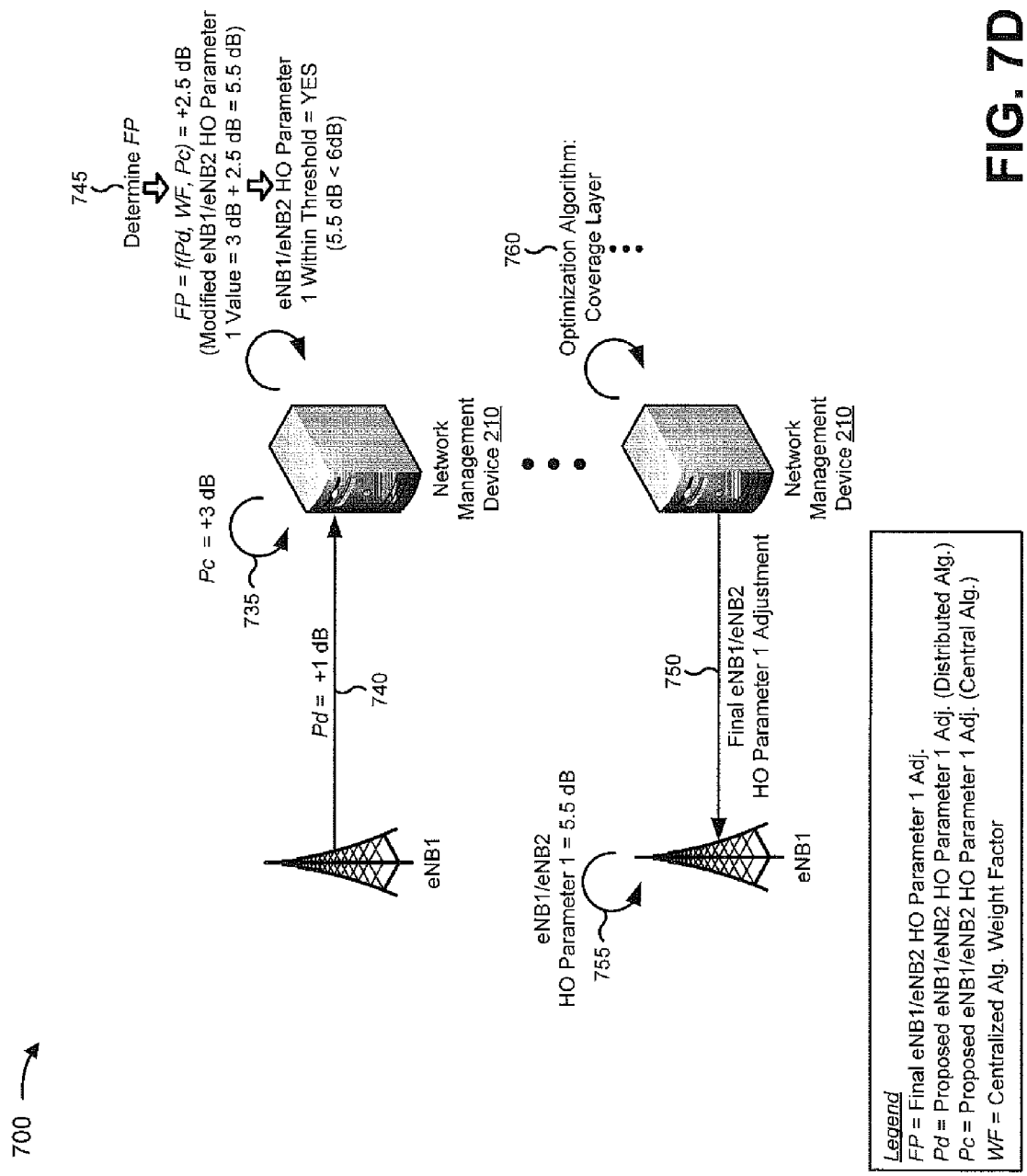

As shown in FIG. 7D, and by reference number 735, network management device 210 may execute (e.g., based on the performance information received from collection device 250) a centralized SON algorithm associated with adjusting eNB1/eNB2 handover parameter 1, and may determine that an eNB1/enB2 handover parameter 1 adjustment, proposed by the centralized SON algorithm, is an increase of 3 decibels (dB). As shown by reference number 740, network management device 210 may also determine (e.g., based on a request sent to eNB1), that an eNB1/enB2 handover parameter 1 adjustment, proposed by a distributed SON algorithm (e.g., executed by eNB1 based on eNB1 performance information monitored by eNB1), is an increase of 1 dB.

As shown by reference number 745, network management device 210 may determine a final parameter adjustment (FP) based on a function that uses the adjustment proposed by the centralized SON algorithm, the weight factor to be applied to the adjustment proposed by the centralized SON algorithm, and the adjustment proposed by the distributed SON algorithm as inputs. As shown, network management device 210 may determine, based on evaluating the function, that the final parameter adjustment is an increase of 2.5 dB (e.g., such that the adjusted eNB1/eNB2 parameter value is to be 5.5 dB). As further shown, network management device 210 may determine (e.g., based on the parameter information received from base station information device 240) that the adjusted eNB1/eNB2 handover parameter 1 value will be less than a maximum eNB1/eNB2 handover parameter 1 value threshold (e.g., 5.5 dB<6 dB). In other words, network management device 210 may determine that the final parameter adjustment may be applied to the eNB1/eNB2 handover parameter 1 value.

As shown by reference number 750, network management device 210 may provide, to eNB1, information associated with the final eNB1/eNB2 handover parameter 1 adjustment in order to cause eNB1 to adjust the eNB1/eNB2 handover parameter 1 value, and, as shown by reference number 755, eNB1 may apply the final parameter adjustment, accordingly. As shown by reference number 760, network management device 210 may then identify a next layer of the layered optimization algorithm (e.g., a coverage layer) and may proceed accordingly.

As indicated above, FIGS. 7A-7D are provided merely as an example. Other examples are possible and may differ from what was described with regard to FIGS. 7A-7D.

Implementations described herein may provide a dynamic control mechanism that integrates parameter adjustments, provided by a network management device (e.g., a centralized SON algorithm) and a base station (e.g., a distributed SON algorithm), such that the parameter adjusts do not conflict, require one SON algorithm to override another SON algorithm, or require either SON algorithm to be disabled.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
determine that a parameter of a base station is to be adjusted,
the base station being included in a network;
determine a first proposed parameter adjustment, associated with the parameter of the base station, based on a first self-organizing network (SON) algorithm,
the first SON algorithm being associated with adjusting the parameter based on performance information associated with multiple base stations included in the network;
determine a second proposed parameter adjustment, associated with the parameter of the base station, based on a second SON algorithm,
the second SON algorithm being associated with adjusting the parameter based on performance information associated with the base station;
determine a weight factor associated with the base station,
the weight factor being associated with a relationship between the base station and one or more neighbor base stations included in the network;
determine a final parameter adjustment based on the first proposed parameter adjustment, the second proposed parameter adjustment, and the weight factor; and
cause the parameter of the base station to be adjusted based on the final parameter adjustment.

2. The device of claim 1, where the one or more processors are further to:
receive distance information associated with the base station and the one or more neighbor base stations;
receive radio frequency (RF) characteristic information associated with the base station and the one or more neighbor base stations; and
where the one or more processors, when determining the weight factor associated with the base station, are to:
determine the weight factor based on the distance information and the RF characteristic information.

3. The device of claim 1, where the one or more processors are further to:
determine a weight factor threshold associated with the weight factor;
identify whether the weight factor satisfies the weight factor threshold; and
where the one or more processors, when determining the weight factor, are to:
determine the weight factor based on identifying whether the weight factor satisfies the weight factor threshold.

4. The device of claim 1, where the one or more processors are further to:
apply the weight factor to the first proposed parameter adjustment; and
where the one or more processors, when determining the final parameter adjustment, are to:
determine the final parameter adjustment based on applying the weight factor to the first proposed parameter adjustment.

5. The device of claim 1, where the one or more processors, are further to:
identify a current parameter value of the parameter of the base station;
determine, based on the final parameter adjustment and the current parameter value, an adjusted parameter value;
determine a parameter value threshold associated with the parameter;
identify whether the adjusted parameter value satisfies the parameter value threshold; and
where the one or more processors, when determining the final parameter adjustment, are to:
determine the final parameter adjustment based on identifying whether the adjusted parameter value satisfies the parameter value threshold.

6. The device of claim 1, where the one or more processor are further to:
determine a previous proposed parameter adjustment associated with the parameter,
the previous proposed parameter adjustment being associated with the second SON algorithm; and
where the one or more processors, when determining the final parameter adjustment, are to:
determine the final parameter adjustment based on the previous proposed parameter adjustment.

7. The device of claim 1, where the one or more processors are to:
receive performance information associated with the network;
execute, based on the performance information, a layer of a layered optimization algorithm;
identify, based on executing the layer of the layered optimization algorithm, a network event associated with the base station; and
where the one or more processors, when determining that the parameter of the base station is to be adjusted, are to:
determine that the parameter of the base station is to be adjusted based on identifying the network event associated with the base station.

8. A non-transitory computer-readable medium storing instructions, the instructions comprising:
one or more instructions that, when executed by one or more processors, cause the one or more processors to:
determine that a parameter of a base station, included in a network, is to be adjusted;
determine, based on a centralized self-organizing network (SON) algorithm, a first proposed parameter adjustment associated with the parameter of the base station,
the centralized SON algorithm identifying the first proposed parameter adjustment based on performance information associated with multiple base stations included in the network;

determine, based on a distributed SON algorithm, a second proposed parameter adjustment associated with the parameter of the base station,
 the distributed SON algorithm identifying the second proposed parameter adjustment based on performance information associated with the base station;
create a weight factor associated with the base station,
 the weight factor being created based on information associated with the base station and one or more neighbor base stations included in the network;
determine a final parameter adjustment,
 the final parameter adjustment being based on the first proposed parameter adjustment, the second proposed parameter adjustment, and the weight factor; and
cause the parameter of the base station to be adjusted based on the final parameter adjustment.

9. The non-transitory computer-readable medium of claim 8, where the one or more instructions, when executed by the one or more processors, further cause the one or more processors to:
receive distance information associated with the base station and the one or more neighbor base stations;
receive radio frequency (RF) characteristic information associated with the base station and the one or more neighbor base stations; and
where the one or more instructions, that cause the one or more processors to create the weight factor associated with the base station, cause the one or more processors to:
 create the weight factor based on the distance information and the RF characteristic information.

10. The non-transitory computer-readable medium of claim 8, where the one or more instructions, when executed by the one or more processors, further cause the one or more processors to:
determine a weight factor threshold associated with the weight factor;
identify whether the weight factor satisfies the weight factor threshold; and
where the one or more instructions, that cause the one or more processors to create the weight factor, cause the one or more processors to:
 create the weight factor based on identifying whether the weight factor satisfies the weight factor threshold.

11. The non-transitory computer-readable medium of claim 8, where the one or more instructions, when executed by the one or more processors, further cause the one or more processors to:
apply the weight factor to the second proposed parameter adjustment; and
where the one or more instructions, that cause the one or more processors to determine the final parameter adjustment, cause the one or more processors to:
 determine the final parameter adjustment based on applying the weight factor to the second proposed parameter adjustment.

12. The non-transitory computer-readable medium of claim 8, where the one or more instructions, when executed by the one or more processors, further cause the one or more processors to:
identify a current parameter value of the parameter of the base station;
determine, based on the final parameter adjustment and the current parameter value, an adjusted parameter value;
determine a parameter value threshold associated with the parameter;
identify whether the adjusted parameter value satisfies the parameter value threshold; and
where the one or more instructions, that cause the one or more processors to determine the final parameter adjustment, cause the one or more processors to:
 determine the final parameter adjustment based on identifying whether the adjusted parameter value satisfies the parameter value threshold.

13. The non-transitory computer-readable medium of claim 8, where the one or more instructions, when executed by the one or more processors, further cause the one or more processors to:
determine a previous proposed parameter adjustment associated with the parameter,
 the previous proposed parameter adjustment being associated with the centralized SON algorithm; and
where the one or more instructions, that cause the one or more processors to determine the final parameter adjustment, cause the one or more processors to:
 determine the final parameter adjustment based on the previous proposed parameter adjustment.

14. The non-transitory computer-readable medium of claim 8, where the one or more instructions, when executed by the one or more processors, further cause the one or more processors to:
receive performance information associated with the network;
execute, based on the performance information, a layer of a layered optimization algorithm;
identify, based on executing the layer of the layered optimization algorithm, a network event associated with the base station; and
where the one or more instructions, that cause the one or more processors to determine that the parameter of the base station is to be adjusted, cause the one or more processors to:
 determine that the parameter of the base station is to be adjusted based on identifying the network event associated with the base station.

15. A method, comprising:
determining, by a device, that a parameter of a base station is to be adjusted,
 the base station being included in a network;
determining, by the device, a first proposed adjustment, associated with the parameter of the base station, based on a first algorithm,
 the first algorithm being associated with adjusting the parameter based on performance information associated with multiple base stations included in the network;
receiving, by the device, a second proposed adjustment, associated with the parameter of the base station, based on a second algorithm,
 the second algorithm being associated with adjusting the parameter based on performance information associated with the base station;
computing, by the device, a final adjustment based on the first proposed adjustment and the second proposed adjustment; and
causing, by the device, the parameter of the base station to be adjusted based on the final adjustment.

16. The method of claim 15, further comprising:
determining a weight factor associated with the base station, the weight factor being associated with a relationship between the base station and one or more neighbor base stations associated with the base station; and where computing the final adjustment comprises:
   computing the final adjustment based on the weight factor.

17. The method of claim 16, further comprising:
receiving distance information associated with the base station and the one or more neighbor base stations;
receiving radio frequency (RF) characteristic information associated with the base station and the one or more neighbor base stations; and
where determining the weight factor associated with the base station further comprises:
   determining the weight factor based on the distance information and the RF characteristic information.

18. The method of claim 17, where the RF characteristic information includes at least one of:
path loss information;
received signal strength information;
signal to noise ratio information;
network loading information;
inter-frequency path-loss discrepancy information;
operator bias information;
restricted value information; or
default value information.

19. The method of claim 15, further comprising:
identifying a current parameter value for the parameter of the base station;
determining, based on the final adjustment and the current parameter value, an adjusted parameter value;
determining a parameter value threshold associated with the parameter;
identifying whether the adjusted parameter value satisfies the parameter value threshold; and
where computing the final adjustment comprises:
   computing the final adjustment based on identifying whether the adjusted parameter value satisfies the parameter value threshold.

20. The method of claim 15, further comprising:
receiving performance information associated with the network;
executing, based on the performance information, a layer of a layered optimization algorithm;
identifying, based on executing the layer of the layered optimization algorithm, a network event associated with the base station; and
where determining that the parameter of the base station is to be adjusted comprises:
   determining that the parameter of the base station is to be adjusted based on identifying the network event associated with the base station.

* * * * *